United States Patent [19]

Inman et al.

[11] Patent Number: 5,159,877
[45] Date of Patent: Nov. 3, 1992

[54] ROTOR ARRANGEMENT FOR A BAGGING MACHINE

[75] Inventors: Larry Inman, Warrenton; Mike Koskela, Astoria, both of Oreg.

[73] Assignee: Ag-Bag Corporation, Warrenton, Oreg.

[21] Appl. No.: 804,607

[22] Filed: Dec. 10, 1991

[51] Int. Cl.$^5$ .............................................. B65B 3/04
[52] U.S. Cl. ................................. 100/144; 100/65; 100/177; 141/114; 198/642
[58] Field of Search ............... 100/65, 100, 144, 177; 141/114; 198/642

[56] References Cited

U.S. PATENT DOCUMENTS

| | | | |
|---|---|---|---|
| 4,046,068 | 9/1977 | Eggenmüller et al. | 100/100 X |
| 4,256,031 | 3/1984 | Ryan | 100/144 X |
| 4,308,901 | 1/1982 | Lee | 100/100 X |
| 4,310,036 | 1/1982 | Rusmussen et al. | 141/114 |
| 4,337,805 | 7/1982 | Johnson et al. | 141/114 X |
| 4,621,666 | 11/1986 | Ryan | 100/100 X |
| 4,688,480 | 8/1987 | Ryan | 100/144 |
| 4,724,762 | 2/1988 | Ryan | 100/144 X |
| 4,949,633 | 8/1990 | Johnson et al. | 100/65 |

Primary Examiner—Harvey C. Hornsby
Assistant Examiner—Stephen F. Gerrity
Attorney, Agent, or Firm—Robert L. Harrington

[57] ABSTRACT

A rotor arrangement for a bagging machine includes a tooth configuration providing both uniform power requirements and well directed compaction forces for uniform distribution of compacted crop material within a storage bag. The rotor arrangement includes right lead and left lead tooth groups wherein members of each right lead and left lead tooth groups sequentially enter a slot of a stripping comb beginning with the right and left, respectively, member of the group. The right lead groups occupy the same length portion of the rotor arrangement as corresponding left lead groups, but are angularly offset whereby rightward compaction forces of one group are followed by leftward compaction forces of the other group. The right and left tooth groups may be organized according to double-helix mounting patterns upon a mounting member. The net compaction force is substantially straight away from the rotor arrangement and has substantially uniform power requirements for uniform compaction within the storage bag.

18 Claims, 4 Drawing Sheets

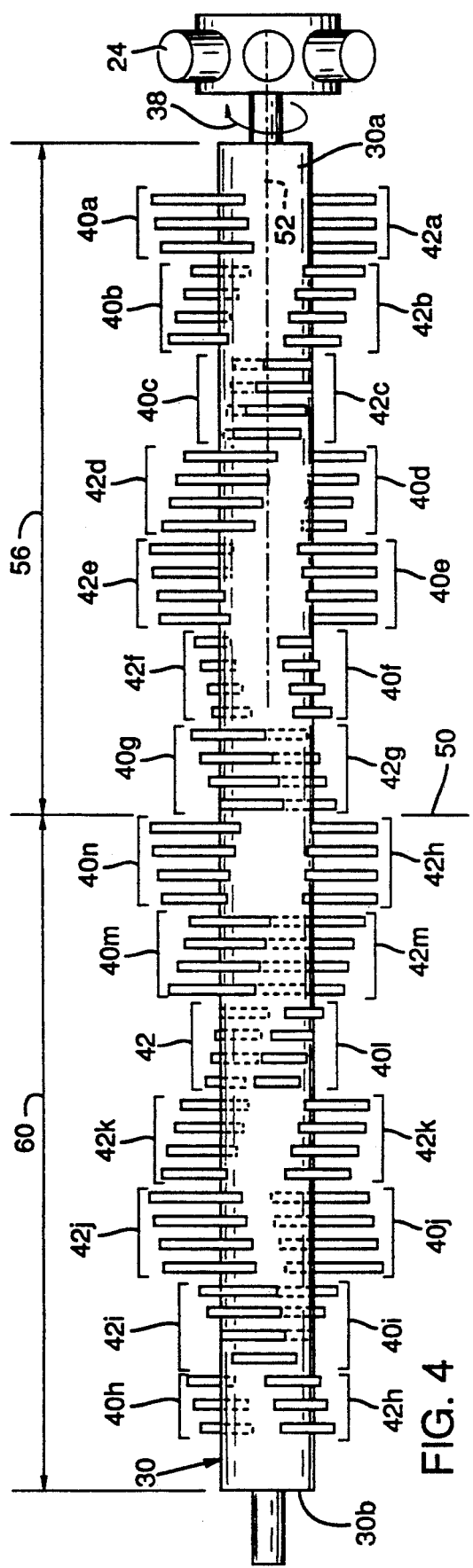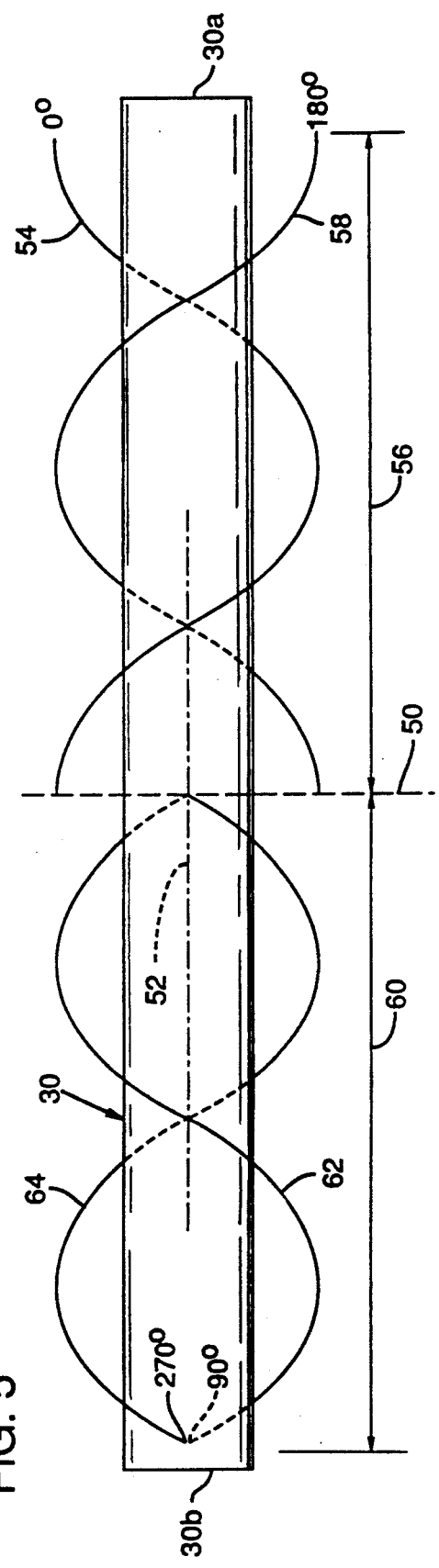
FIG. 4
FIG. 5

ROTOR ARRANGEMENT FOR A BAGGING MACHINE

BACKGROUND OF THE INVENTION

This invention relates generally to compaction apparatus, and particularly to agricultural compaction apparatus such as bagging machines.

An agricultural bagging machine is used to compact field crop such as silage within a large storage bag. The bagging machine generally includes an input mechanism for accepting the crop and feeding the crop through a rotor arrangement which in turn compacts the crop within a storage bag releasably deployed behind the bagging machine. As the machine fills the storage bag with crop, it moves forward while deploying the filled bag rearward upon the ground.

The rotor arrangement plays an important role in delivering the crop material into the bag in a desired state of compaction. The rotor arrangement generally takes the form of a cylindric mounting member carrying a plurality of teeth which engage the crop material on the input side and deliver the material at the bag opening. As the teeth return to the input side, they pass through slots in a comb arrangement for preventing return of crop material to the input side of the rotor. The configuration of these rotor teeth determine the nature of compaction provided by the bagging machine as well as the load requirements on the rotor motor. It is desirable to maintain substantially the same number of teeth passing through the stripping comb at any time in order to maintain substantially constant power requirements because intermittent power spikes degrade the rotor motor. Rotor configurations addressing the need to maintain substantially the same number of teeth in the comb at any given time, however, often adversely affect the resulting compaction forces. For example, a simple spiraling tooth configuration provides a constant number of teeth in the comb, but tends to push the crop material rightward or leftward and undesirably over compacts one side of the bag.

U.S. Pat. No. 4,337,805 entitled "Agricultural Bag Loading Apparatus" and assigned to the assignee of the present invention describes a rotor arrangement for an agricultural bagging machine. A plurality of teeth are mounted on the rotor shaft in random configuration with the teeth being generally evenly distributed on the surface of the shaft. The teeth are adapted to force silage from an intake chamber through a passageway under the rotor and into an output chamber. As the shaft further rotates, the teeth pass through a stripping comb mounted adjacent the rotor arrangement for removing crop material from the teeth upon return to the input chamber. The disclosure of U.S. Pat. No. 4,337,805 is incorporated herein in its entirety.

In a typical case, compaction is desirably provided in a linear fashion directly behind the rotor arrangement and into the storage bag without pushing the crop material to the right or left side of the bag. In other cases it may be desirable to over compact the center or over compact the sides in order to provide a desired crop compaction within the bag.

It is, therefore, desirable that a rotor arrangement of a crop bagging machine provide a desired crop compaction, e.g., uniform left to right compaction, within a storage bag, employ a relatively large number of rotor teeth, and operate under consistent power requirements. The subject matter of the present invention provides such a rotor arrangement for a bagging machine.

SUMMARY OF THE INVENTION

According to one aspect of the present invention, a bagging machine may be adapted to provide crop material into a storage bag along a path aligned with the longitudinal axis of the bag for uniform compaction within the bag without left or right side overloading of the bag. In a second aspect of the present invention, the power demands of the bagging machine are substantially constant without intermittent power spikes.

In the preferred embodiment of the present invention, a rotor arrangement for a bagging machine comprises a generally cylindric mounting member adapted for rotation about its longitudinal axis in a given rotation direction and has a left and right end. A stripping comb mounts adjacent the rotor and defines a set of comb slots. A rotor tooth configuration upon the mounting member defines two types of rotor tooth groups. Each tooth of each group is positioned to pass through a corresponding one of the comb slots. A first group type is a left lead group wherein the teeth enter the corresponding comb slots sequentially beginning with a left most tooth. A second group type is a right lead group type wherein the teeth enter the corresponding comb slot sequentially beginning with a right most member.

By suitably arranging the relative positioning of the right lead groups and left lead groups, a relatively large number of well distributed rotor teeth are used. Also, the right lead tooth groups and left lead tooth groups tend to push the crop material in the left and right, respectively, directions relative to the longitudinal axis of the storage bag. By suitable tooth group configuration, the net effect of compaction is uniform across the width of the storage bag and generally in line with the longitudinal axis of the storage bag.

According to one aspect the preferred embodiment of the present invention, each left lead rotor tooth group corresponds to a right lead rotor tooth group wherein corresponding teeth of corresponding groups pass through the same comb slots. This relationship between individual teeth of right and left lead groups provides alternating rightward and leftward compaction forces in the flow of crop material into the storage bag and thereby provides a generally well oriented compaction force.

According to another aspect the preferred embodiment of the present invention, the rotor tooth configuration provides a plurality of left lead groups and a plurality of right lead groups in such configuration that the left lead groups define a first helix pattern beginning at a first angular position and the plurality of right lead groups define second helix pattern, but beginning at a second angular position. In this arrangement, the corresponding right and left lead groups may be offset by 180 degrees for uniform compaction and power demands.

According to another aspect the preferred embodiment of the present invention, the rotor tooth configuration includes a plurality of left lead groups and a plurality of right lead groups wherein the arrangement of tooth groups take the form of four helix patterns. For a first length portion of the mounting member, right and left lead group helix patterns are offset by 180 degrees whereby corresponding tooth groups are offset by 180 degrees. In a second length portion of the mounting member, right and left lead groups are offset in similar helix patterns with corresponding tooth groups offset by 180 degrees, but the double-helix patterns of the first length portion and the second length portion are relatively offset for providing a smooth distribution of rotor teeth across the length of mounting member while maintaining uniform compaction force upon the crop material.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 4 is another view of the rotor arrangement as taken alone lines 4—4 of FIG. 1, but showing only the rotor mounting member and rotor teeth.

FIG. 5 illustrates the arrangement of right and left lead tooth groups in related helix patterns on the mounting member.

DETAILED DESCRIPTION OF THE PREFERRED EMBODIMENT

Figure 1:
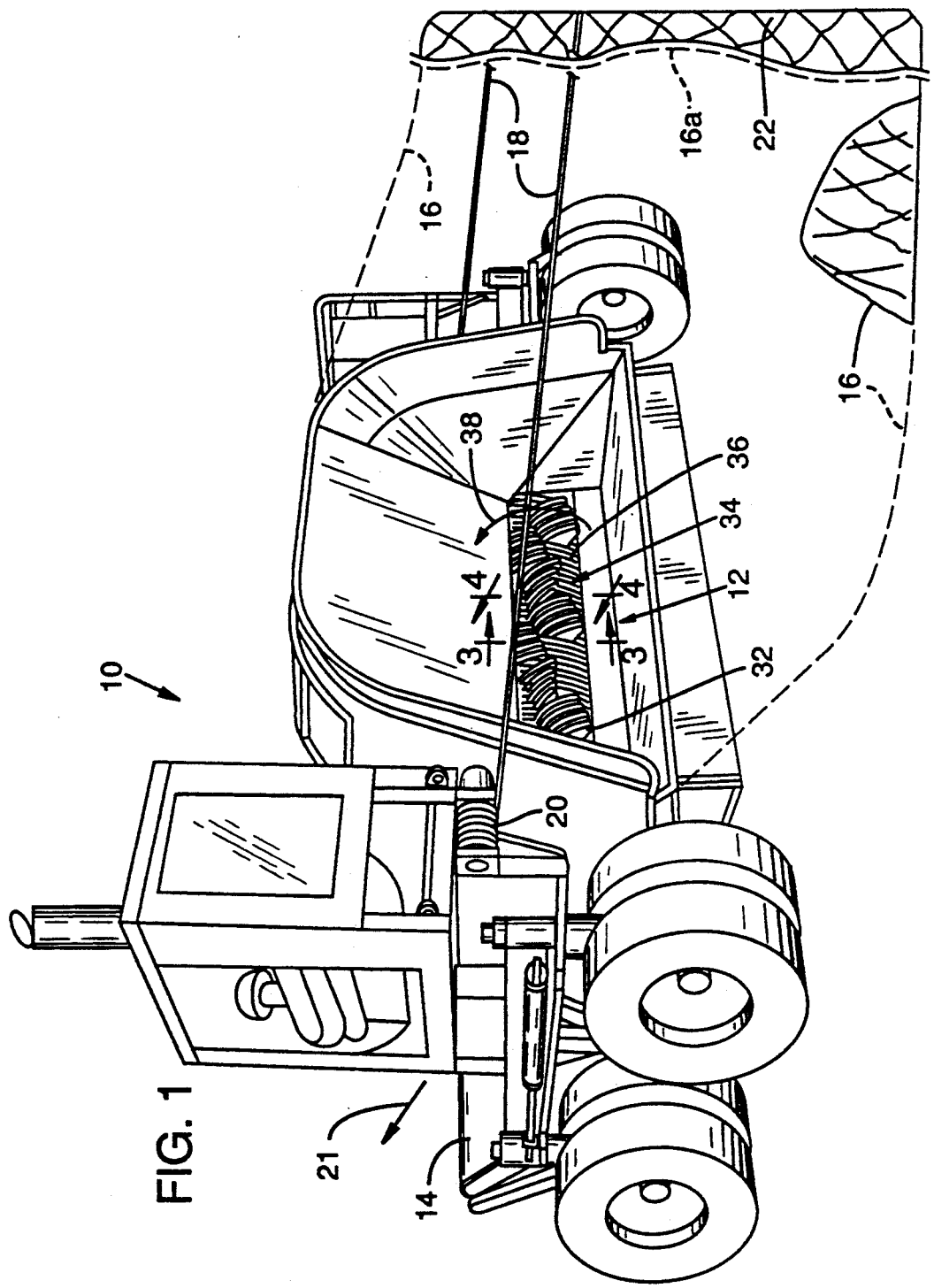
FIG. 1 is a perspective view of an agricultural bagging machine employing a rotor arrangement according to a preferred embodiment of the present invention.

FIG. 1 illustrates an agricultural bagging machine 10 employing a rotor arrangement 12 according to a preferred embodiment of the present invention. In use of bagging machine 10, agricultural crop material, e.g., silage, is deposited on an input conveyor 14 for delivery to the rotor arrangement 12 and compaction within a storage bag 16. The bagging machine 10 includes a set of cables 18 and drums 20 for reasonably deploying cables 18. The distal ends of cables 18 secure a net 22 for capturing the closed end 16a of bag 16. As the rotor arrangement 12 compacts the crop material within bag 16, i.e., pushes against the restraint provided by the net 22, the drums 20 controllably release cables 18 to deploy additional length portions of bag 16 and thereby fill bag 16 with compacted crop material as machine 10 moves in the forward direction 21.

A hydraulic motor 24 (FIG. 4) rotates the rotor arrangement 12 in the rotational direction 38. By actuation of motor 24, provision of crop material upon conveyor 14, and controllable deployment of cables 18 by way of drums 20, the bagging machine 10 fills the storage bag 16 with compacted crop material.

The rotor arrangement 12 includes a generally cylindric mounting member 30 (FIG. 4) and a number of rotor teeth 32. The mounting member 30 mounts rotationally upon the body of bagging machine 10 adjacent a stripping comb 34 having a series of slots 36. Upon actuation of motor 24, each tooth 32 of rotor arrangement 12 rotates through a corresponding one of slots 36 of comb 34. More particularly, each slot 36 corresponds to two of teeth 32. Thus, as hydraulic motor 24 moves mounting member 30 in the rotational direction 38, teeth 32 engage the crop material and force the crop material under rotor arrangement 12 for compaction within bag 16. As the rotor continues rotation in the direction 38, the teeth 32 pass through comb 34 and the crop material is stripped from teeth 32. In this manner, the crop material deposited upon input conveyor 14 moves past rotor arrangement 12 and into bag 16.

Figure 3:
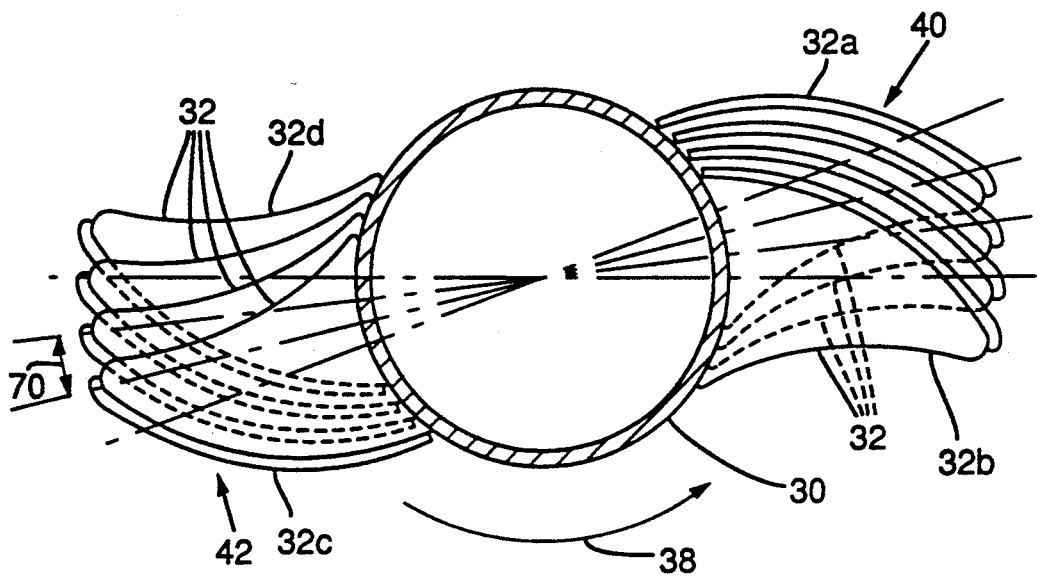
FIG. 3 is a sectional view of the rotor arrangement as taken along lines 3—3 of FIG. 1 and showing the use of corresponding left lead and right lead tooth groups on a mounting member.

FIG. 3 is a sectional view taken along lines 3—3 of FIG. 1 showing two types of tooth group configurations and the relative orientation therebetween. Longitudinally adjacent teeth 32 are organized as groups in either a right lead tooth group 40 or a left lead tooth group 42. Taking into account the rotational direction 38 of member 30, it is seen that the teeth 32 of right lead tooth group 40 enter the corresponding slots 36 (not shown in FIG. 3) sequentially beginning with a right most leading tooth 32a and ending with a left most trailing tooth 32b. Similarly, individually members of the left lead tooth group 42 enter sequentially the corresponding slots 36 beginning with a left most leading tooth 32c and ending with a right most trailing tooth 32d. Thus, the angular offset of teeth 32 within each group 40 and 42 is by sequential angular offset corresponding to longitudinal position within the group.

In the preferred embodiment of the present invention, corresponding right lead and left lead tooth groups 40 and 42 occupy the same longitudinal position on member 30, include the same number of teeth 32, and are offset by 180 degrees. Thus, corresponding ones of the teeth 32 of corresponding right lead groups 40 and left tooth groups 42 occupy the same longitudinal position on member 30. In this manner, corresponding ones of teeth 32 in corresponding right and left lead tooth groups 40 and 42 pass through the same slot 36. For example, the leading tooth 32a of right lead tooth group 40 passes through the same slot 36 as does the trailing tooth 32d of the corresponding left lead group 42. Similarly, trailing tooth 32b and leading tooth 32c of corresponding tooth groups 40 and 42, respectively, also pass through a common slot 36.

It may be appreciated that because the corresponding tooth groups 40 and 42 lead from opposite sides, it is not possible according to this embodiment to offset corresponding teeth 32 of corresponding tooth groups 40 and 42 by exactly 180 degrees. The corresponding tooth groups 40 and 42 as a whole are offset by 180 degrees, but not individual corresponding teeth 32 of corresponding tooth groups 40 and 42. The leading tooth 32a and leading tooth 32c of tooth groups 40 and 42, respectively, are offset by 180 degrees, but do not occupy the same longitudinal position along mounting member 30. Similarly, the trailing tooth 32b and trailing tooth 32d of corresponding tooth groups 40 and 42 are offset by 180 degrees, but do not occupy the same longitudinal position along mounting member 30.

Figure 2:
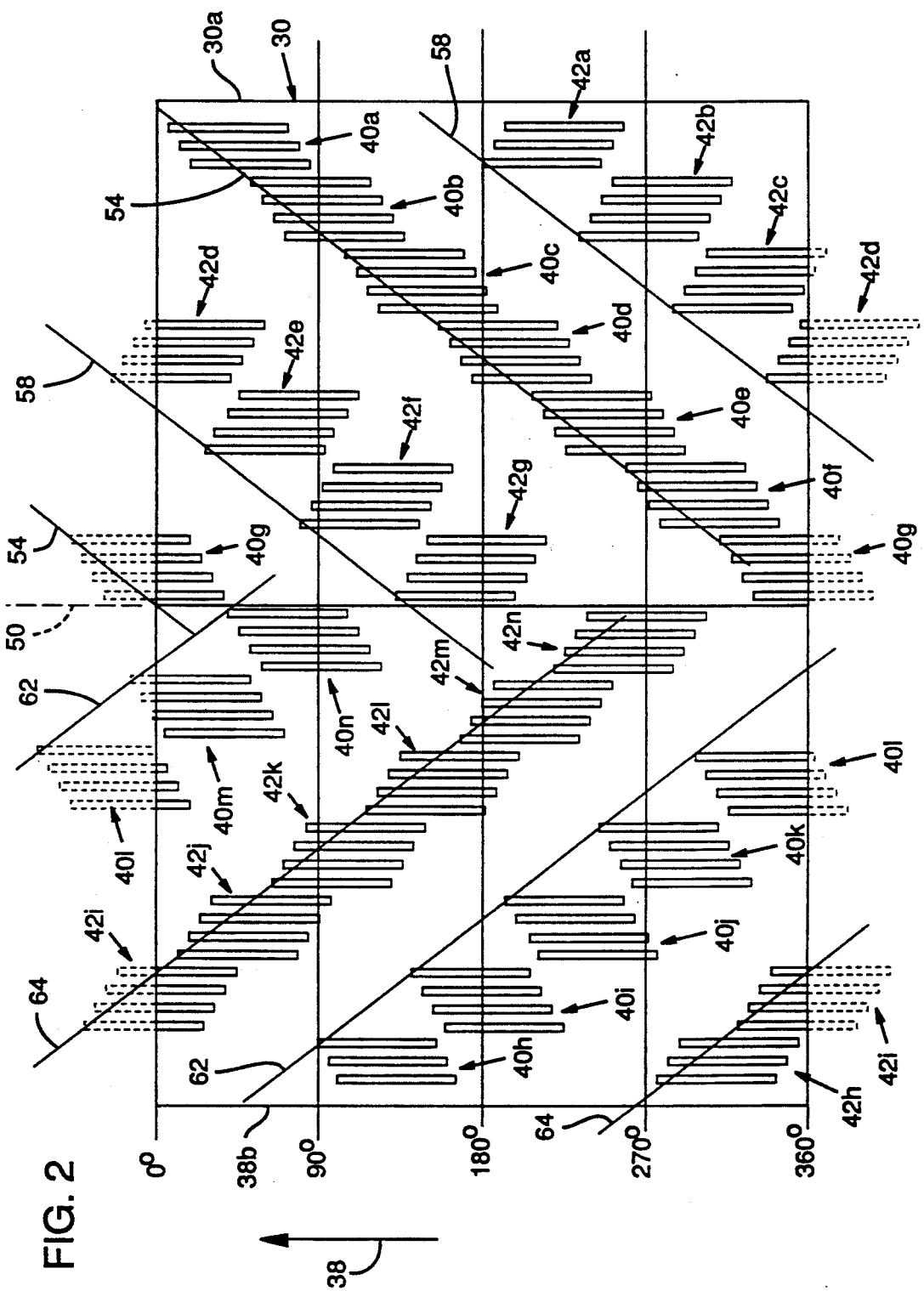
FIG. 2 is a developmental view of the rotor surface and teeth of the rotor arrangement of FIG. 1.

A right lead tooth group 40 tends to push the crop material leftward while a left lead tooth group 42 tends to push it rightward. Thus, it may be appreciated that by angularly offsetting each right lead tooth group 40 relative to the corresponding left lead tooth group 42, but locating along the same lengthwise position on member 30, the net effect of compaction forces on the crop material is generally normal to the longitudinal axis of mounting member 30. In other words, the net effect of the alternating right and left compacting force results in a net compaction force substantially straight away from the rotor arrangement 12. FIG. 2 is a developmental view of the mounting member 30 including a plurality of right lead tooth groups 40 and corresponding left lead tooth groups 42. FIG. 4 is a side view of the mounting member 30 showing the tooth groups 40 and 42 FIG. 5 illustrates helix patterns of tooth groups 40 and 42 upon mounting member 30. According to the illustrated embodiment, the rotor arrangement 12 provides four separate but related helix patterns of right and left lead tooth groups 40 and 42.

In FIGS. 2, 4 and 5, mounting member 30 is shown designating its center line 50, i.e., mid-length point, and longitudinal axis 52 (FIGS. 4 and 5). Beginning at the end 30a of member 30 and moving toward the center line 50 and beginning at a reference radial position of zero degrees, a first helix pattern 54 includes the right lead tooth groups 40a–40g, occupies a half-length portion 56 of mounting member 30 and occupies 360 degrees of spiral relative to axis 52. A second helix pattern 58 includes the left lead tooth groups 42a–42g, also occupies 360 degrees of spiral within half-length portion 56 beginning at end 30a and extending toward center line 50, but begins at a radial position offset 180 degrees relative to that of helix pattern 54. A second half-length portion 60 of mounting member 30 beginning at end 30b and extending toward center line 50 also carries two helix patterns of tooth groups. More particularly, a first helix pattern 62 includes right lead tooth groups 40h–40n, begins at a radial offset of 90 degrees and spirals through 360 degrees about axis 52. A second helix pattern 64 of left length portion 60 includes the left lead tooth groups 42h–42n, begins at a radial offset of 270 degrees and spirals through 360 degrees about axis 52.

Thus, the mounting member 30 is divided into two length sections with respect to center line 50. Each section has a double-helix pattern of tooth groups. One double-helix pattern, comprising helix 54 and helix 58, begins at zero and 180 degrees and a second double-helix pattern, comprising helix 62 and helix 64, begins at 90 and 270 degrees.

Figure 6:
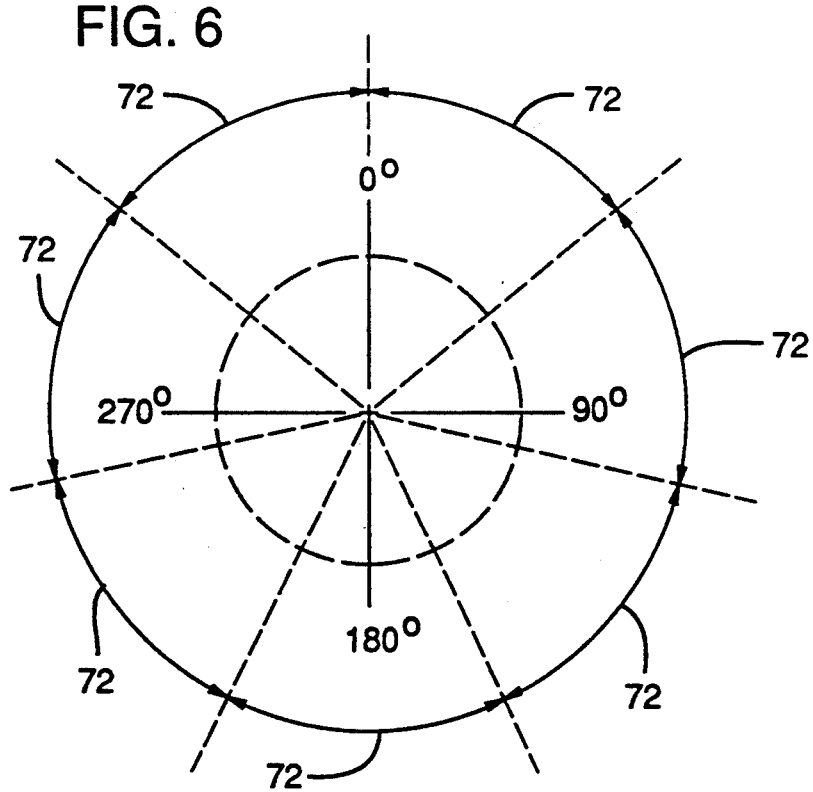
FIG. 6 illustrates right lead and left lead tooth group angular offsets in forming a helix pattern of tooth groups.

Returning to FIG. 3, the typical angular offset 70 between teeth 32 of each tooth group is determined by dividing the number of slots 36 in the comb 34 by 360 degrees. In FIG. 6, the typical tooth group angular offset 72, e.g., the offset between consecutive right lead tooth groups 40a–40g along helix 54, is equal to 360 degrees divided by one-half the total number of group patterns in a half length section, i.e., the total number of group patterns in one helix. The total number of teeth is equal to two times the number of slots 36 in the comb 34, i.e., each slot 36 corresponds to a tooth 32 of a right lead group 40 and to a tooth 32 of a corresponding left lead group 42. In the illustrated embodiment, the rotor arrangement 12 is nine feet in length, has 108 teeth 32 and the stripping comb 34 has fifty-four slots 36. Thus, the angular offset 70 (FIG. 3) between teeth 32 of each tooth group 40 and 42 is approximately 6.66 degrees. The number of tooth groups in one length section is fourteen, seven in each helix pattern. The angular offset 72 (FIG. 6) between consecutive tooth groups in a helix pattern is approximately 51.42 degrees. Each of tooth groups 40 and 42 have four members, with the exception of those most distant from center line 50, i.e., 40a, 42a, 40h and 42h, which have three members to accommodate the particular number of slots 36 available.

In the illustrated embodiment, the number of teeth 32 per group 40 or 42 may vary between two teeth to a maximum of 25 percent of the total number of teeth. The placement of the groups 40 and 42 in the helix patterns described is not necessarily a set pattern. Such patterns ma vary according to a desired control over the resulting material flow. In the embodiment illustrated herein, such material flow and the resulting compaction is substantially straight away from the rotor arrangement 12 whereby rightward and leftward compaction forces developed by corresponding tooth groups is offset to provide a substantially uniform compaction force across the rotor arrangement 12 approximately normal to the axis of rotation 52. This configuration avoids over-compacting of either the right or left side of bag 16 relative to the other. The subject matter of the present invention is particularly well adapted to provide a variety of compaction forces. It should be understood, therefore, that other desired compaction forces may be provided in accordance with the present invention.

Thus, an improved rotor arrangement for a bagging machine has been shown and described. The illustrated rotor arrangement avoids spiking or surging of the hydraulic pressure due to the sudden introduction of a large number of teeth in the stripping comb at a given time. The teeth are well distributed about the mounting member and substantially the same number of teeth pass through the stripping comb at any given time period. Thus, the distribution of rotor teeth in accordance with the present invention provides substantially equal pressure on the rotor at all times. Also, by suitably organizing the tooth groups of the rotor arrangement a desired compaction, e.g., straight away from the rotor, within the bag is achieved.

I will be appreciated that the present invention is not restricted to the particular embodiment that has been described and illustrated herein, and that variations may be made therein without departing from the scope of the invention as found in the appended claims and equivalents thereof. For example, a rotor arrangement organized by grouping of teeth wherein members within each group are angularly offset and groups are angularly offset relative to other groups provides the important feature consistent power demand because it possible to maintain approximately the same number of teeth in the comb at any given time. According to the preferred embodiment, such arrangement can include right lead and left lead tooth groups and relative positioning therebetween to accomplish the additional feature of uniform and well directed compaction forces.

What is claimed is:

1. A rotor arrangement for compaction apparatus, the rotor arrangement comprising:
    a mounting member mounted upon the compaction apparatus for rotation about an axis of rotation; and
    a plurality of teeth distributed upon the surface of the mounting member, the organization of tooth distribution being by tooth groups, the groups being angularly offset relative to one another about said axis of rotation, the tooth members of each group being angularly offset relative to one another.

2. A rotor arrangement according to claim 1 wherein said grouping is by grouping of teeth longitudinally adjacent.

3. A rotor arrangement according to claim 2 wherein the angular offset of said tooth members within each group is by sequential angular offset corresponding to longitudinal position within the group.

4. A rotor arrangement according to claim 3 wherein grouping of teeth is in such manner to provide left lead tooth groups and right lead tooth groups wherein left lead tooth groups have a leading leftmost tooth and a trailing rightmost tooth and right lead groups have a leading right most tooth and a trailing leftmost tooth.

5. A rotor arrangement according to claim 4 wherein the angular offset of said group is according to a helix pattern.

6. A rotor arrangement according to claim 4 wherein the angular offset of said groups is according to first and second helix patterns occupying a length portion of the mounting member, a sequence of left lead groups following the first helix pattern and a corresponding sequence of right lead groups following the second helix whereby corresponding right and left lead groups occupy similar longitudinal positions of the mounting member.

7. A rotor arrangement according to claim 6 wherein said first and second helix patterns comprise a double helix pattern whereby corresponding right lead and left lead groups are offset by 180 degrees.

8. A rotor arrangement according to claim 1 wherein the angular offset of said groups is according to a helix pattern.

9. A rotor arrangement for a bagging machine comprising:
- a mounting member adapted for rotation in a given rotational direction about its longitudinal axis, said mounting member having a right end and a left end;
- a comb member mounted adjacent said mounting member, said comb member defining a set of comb slots; and
- a rotor tooth configuration having groups of teeth mounted upon said mounting member, each tooth being positioned to pass through a corresponding one of the comb slots, a first group type being a left lead group wherein each left lead group member enters its corresponding comb slot sequentially beginning with the left lead group member nearest the left end of said mounting member, a second group type being a right lead group wherein each right lead group member enters its corresponding comb slot sequentially beginning with the right lead group member nearest the right end of said mounting member.

10. The rotor arrangement according to claim 9 wherein right lead groups correspond to left lead groups whereby each member of a left lead group corresponds to a member of a right lead group in such manner that corresponding teeth of corresponding right and left lead groups pass through the same comb slots.

11. The rotor arrangement according to claim 9 wherein each member of a left lead group corresponds to a member of a right lead group in such manner that corresponding teeth of corresponding right and left lead groups are angularly offset according to an angular offset of corresponding right and left lead groups.

12. The rotor arrangement according to claim 9 wherein each tooth of a left lead group corresponds to a tooth of a right lead group in such manner that corresponding tooth of corresponding right and left lead groups pass through the same comb slot and corresponding right and left lead tooth groups are angularly offset upon said mounting member by 180 degrees.

13. The rotor arrangement according to claim 9 wherein said rotor tooth configuration comprises a plurality of left lead groups and a plurality of right lead groups, the left lead groups being mounted upon said mounting member in a first helix pattern beginning at a first angular position relative to said mounting member, the right lead group being mounted in a second helix pattern beginning at a second angular position.

14. The rotor arrangement according to claim 13 wherein said reference angular position and said second angular position are offset by 180 degrees.

15. The rotor arrangement according to claim 13 wherein said first and second helix patterns extend along a first length portion of said mounting member and said rotor tooth configuration further comprises a second plurality of left lead groups and a second plurality of right lead groups each occupying a second length portion of said mounting member, the second plurality of left lead groups being mounted in helix pattern beginning at a third angular position relative to said reference angular position, the second plurality of right lead groups being mounted in a helix pattern beginning at a fourth angular position.

16. The rotor arrangement according to claim 15 wherein said third and fourth angular positions are offset by 180 degrees.

17. The rotor arrangement according to claim 16 wherein said second and third angular positions are offset by 90 degrees.

18. The rotor arrangement according to claim 15 wherein said first and second helix patterns begin at a first end of said mounting member and extend to a mid-length point of said mounting member and said third and fourth helix patterns begin at a second end of said mounting member and extend to said mid-length point.

* * * * *